United States Patent [19]

Raidel

[11] Patent Number: 5,052,712
[45] Date of Patent: Oct. 1, 1991

[54] TORQUE BEAM, EQUALIZED PNEUMATIC AND HYDRAULIC AXLE SUSPENSION

[76] Inventor: John E. Raidel, P.O. Box 4586 G.S., Springfield, Mo. 65808

[21] Appl. No.: 495,644

[22] Filed: Mar. 19, 1990

[51] Int. Cl.⁵ .................. B60G 11/30; B60G 15/12
[52] U.S. Cl. .................................... 280/702; 280/708; 280/711; 280/709; 188/269; 188/314; 267/256; 267/64.13
[58] Field of Search ............... 280/702, 708, 711, 709, 280/714, 6.12, 698; 188/269, 314; 267/64.13, 218, 186

[56] References Cited

U.S. PATENT DOCUMENTS

| | | |
|---|---|---|
| 2,937,034 | 5/1960 | Largen .................................. 280/6.12 |
| 2,987,310 | 6/1961 | Ord ........................................ 267/64.13 |
| 3,008,729 | 11/1961 | Müller et al. ...................... 280/711 |
| 3,025,076 | 3/1962 | Davies .................................. 280/713 |
| 3,848,862 | 11/1974 | Ito et al. ................................ 280/708 |
| 4,206,934 | 6/1980 | McKee .................................. 280/711 |
| 4,345,773 | 8/1982 | Brown .................................. 280/711 |
| 4,761,020 | 8/1988 | Eckel .................................... 280/711 |

FOREIGN PATENT DOCUMENTS

| | | |
|---|---|---|
| 1092781 | 11/1960 | Fed. Rep. of Germany ...... 267/186 |
| 3533540 | 4/1986 | Fed. Rep. of Germany ...... 280/709 |
| 1152495 | 2/1958 | France .......................... 280/DIG. 1 |

Primary Examiner—Charles A. Marmor
Assistant Examiner—Karin Tyson
Attorney, Agent, or Firm—Rogers, Howell & Haferkamp

[57] ABSTRACT

An active, frequency damping suspension system for vehicles having a chassis and at least one axle comprises a pneumatic spring connected mechanically between the vehicle axle and the vehicle chassis to absorb vertical movements of the vehicle axle and prevent them from being transmitted to the chassis, a hydraulic shock absorber connected between the vehicle axle and the vehicle chassis to dampen the vertical movements of the vehicle axle, and a pressure accumulator in fluid communication with the air spring or in fluid communication with both the air spring and the hydraulic shock absorber for enhancing the cushioning effect of the air spring on vertical movements of the vehicle axle and enhancing the dampening effect of the shock absorber on vertical movements of the axle.

19 Claims, 4 Drawing Sheets

TORQUE BEAM, EQUALIZED PNEUMATIC AND HYDRAULIC AXLE SUSPENSION

BACKGROUND OF THE INVENTION (1) Field of the Invention

The present invention relates to air-ride suspension systems for vehicles, in particular a suspension system comprising a leveling valve for maintaining a substantially constant vertical distance between the vehicle chassis and its axles in response to loading and unloading of the vehicle and operation of the vehicle over uneven road surfaces, and a pressure accumulator that accumulates increasing fluid pressure from the suspension system air spring, or the air spring and shock absorber, and resupplies the fluid pressure to the air spring, or air spring and shock absorber, when the fluid pressure of the suspension system decreases.

(2) Description of the Related Art

Air-ride suspension systems of the type provided by the present invention commonly comprise a hanger member, a torque beam, an axle seat, and an air spring. The hanger members are connected to and depend from chassis members of the vehicle. The torque beams are pivotally connected to the hanger members at one end, and are connected in some fashion with the axle seat members at their opposite ends. The axle seats support the vehicle axle, and together with the torque beam, they permit the vehicle axle to move vertically relative to the vehicle chassis by pivoting the axle about the pivot connection between the torque beam and the hanger. The air spring is generally positioned between the axle seat and the vehicle chassis, and dampens the forces exerted on the vehicle chassis caused by vertical movement of the axle and axle seat when the vehicle is driven over uneven road surfaces.

Leveling valves are commonly employed in air-ride suspension systems to respond to changes in the vertical distance between the vehicle chassis and the vehicle axle as the vehicle is driven over an uneven road surface. The leveling valves automatically supply or drain pneumatic pressure to and from the air spring of the suspension system respectively, in response to the changes in the vertical distance between the vehicle chassis and the vehicle axle. The leveling valves automatically supply increased pneumatic pressure to the air springs in response to vertical movement of the vehicle axle toward the vehicle chassis to compensate for this movement, and the leveling valves automatically release pneumatic pressure from the air springs in response to vertical movement of the vehicle axle away from the vehicle chassis to compensate for this movement.

A disadvantage of this type of suspension system, and a disadvantage found in many other types of suspension systems employing air springs and shock absorbers, is that the system does not adequately cushion the shock transmitted to the vehicle by the vehicle axle traveling over a large bump or falling into a large hole in the roadway. The large vertical distance that the axle travels and the abruptness of the axle movement cannot be compensated for quick enough by the supply of pressurized pneumatic fluid or release of pneumatic fluid from the air bag, and a large shock results. Moreover, in air-ride suspension systems employing leveling valves, the frequency of the vertical movement of the vehicle axle relative to the vehicle chassis after the axle has passed over a bump or through a hole in the roadway will sometimes be enhanced by the automatic supply and release of pressurized pneumatic fluid to and from the air bag by the leveling valve.

The present invention overcomes the above described disadvantages of prior art air-ride suspension systems by providing a pressure accumulator in fluid communication with the pneumatic fluid of the air spring and the leveling valve. The pressure accumulator serves to dampen the abrupt and substantial increase in pneumatic pressure caused by the vehicle axle passing over a bump or through a hole in the roadway, and also serves to dampen the frequency of vertical movement of the vehicle axle relative to the vehicle chassis after it has passed over a bump or through a hole. The accumulator of the present invention is also adapted to communicate fluidly with a hydraulic shock absorber positioned between a vehicle axle and chassis. The accumulator serves to dampen the abrupt and substantial increase in hydraulic fluid pressure of the shock absorber when the vehicle axle passes over a large bump or through a large hole in the roadway, and it also serves to enhance the ability of the hydraulic shock absorber to dampen the frequency of vertical movement of the vehicle axle relative to the chassis after the axle has passed over a bump or through a hole.

It is therefore an object of the present invention to provide an improved air-ride suspension system for vehicles that employ a pressure accumulator that communicates fluidly with an air spring of the suspension system in one embodiment, and communicates fluidly with an air spring and a hydraulic shock absorber in a second embodiment, where the pressure accumulator serves to further dampen the shock transmitted from a vehicle axle to the vehicle chassis when the vehicle passes over a bump or through a hole in the roadway, and further serves to dampen the frequency of vertical movement of the vehicle axle relative to the vehicle chassis.

SUMMARY OF THE INVENTION

The suspension system of the present invention includes identical assemblies positioned on opposite sides of a vehicle chassis. On each side of the vehicle chassis a hanger member is suspended downward from a chassis member. A torque beam having first and second ends is pivotally mounted to the hanger member by a pivot bushing at its first end. A beam seat assembly supporting the vehicle axle, or some other structure supporting the vehicle axle, is connected to the second end of the torque beam and moves substantially vertically relative to the vehicle chassis on pivoting movement of the torque beam about its pivot bushing connection to the hanger member. A pneumatic spring assembly, preferably an air spring assembly, is mechanically connected between the second end of the torque beam and the underside of a vehicle chassis member. A shock absorber assembly, preferably a hydraulic shock absorber, is also connected between the torque beam and a vehicle chassis member.

The leveling valve is secured stationary relative to the vehicle chassis and is mechanically connected to either the vehicle axle or the torque beam to enable the valve to operate in response to vertical movement of the vehicle axle relative to the vehicle chassis. A leveling valve of the type employed in the present invention is described in U.S. Pat. No. 4,886,092, assigned to the assignee of the present invention and incorporated herein by reference.

The pressure accumulator of the present invention is also fixed stationary relative to the vehicle chassis and is generally comprised of a hydraulic pressure reducer and a pneumatic transducer. The pneumatic transducer comprises a diaphragm that is in fluid communication with both the pneumatic air spring and the leveling valve of the system by a series of fluid pressure conduits. The hydraulic pressure reducer is in fluid communication with the hydraulic shock absorber by a fluid pressure conduit. The diaphragm of the pneumatic transducer interacts with a first piston slidably received in a cylindrical interior bore of the pressure accumulator. The hydraulic pressure reducer interacts with a second piston slidably received in the cylindrical interior bore of the pressure accumulator. The first and second pistons oppose each other, and are separated by a volume of pressurized fluid, preferably nitrogen gas.

In operation, as the vehicle passes over a bump in the roadway, the vehicle axle is raised vertically toward the vehicle chassis, causing pneumatic pressure in the air spring to increase and hydraulic pressure in the shock absorber to increase. The increase in pneumatic pressure is transmitted through the fluid conduit circuit to the diaphragm of the pneumatic transducer. The increase in hydraulic fluid pressure is transmitted through the fluid conduit circuit to the pressure reducer of the accumulator. The increase in pneumatic pressure and hydraulic fluid pressure cause the transducer diaphragm and pressure reducer respectively, to move the first and second pistons contained in the accumulator interior bore toward each other. The movement of the first and second pistons toward each other compresses the nitrogen gas contained in the accumulator interior between the pistons. As the nitrogen gas compresses, the abrupt increase in pneumatic fluid pressure and the abrupt increase in hydraulic fluid pressure are both damped. In this manner, the shock damping characteristics of both the pneumatic air spring and the hydraulic shock absorber are further enhanced by the pressure accumulator.

BRIEF DESCRIPTION OF THE DRAWINGS

Further objects and features of the present invention are revealed in the following detailed description of the preferred embodiments of the invention and in the drawing figures wherein.

DETAILED DESCRIPTION OF THE PREFERRED EMBODIMENTS

Figure 1:
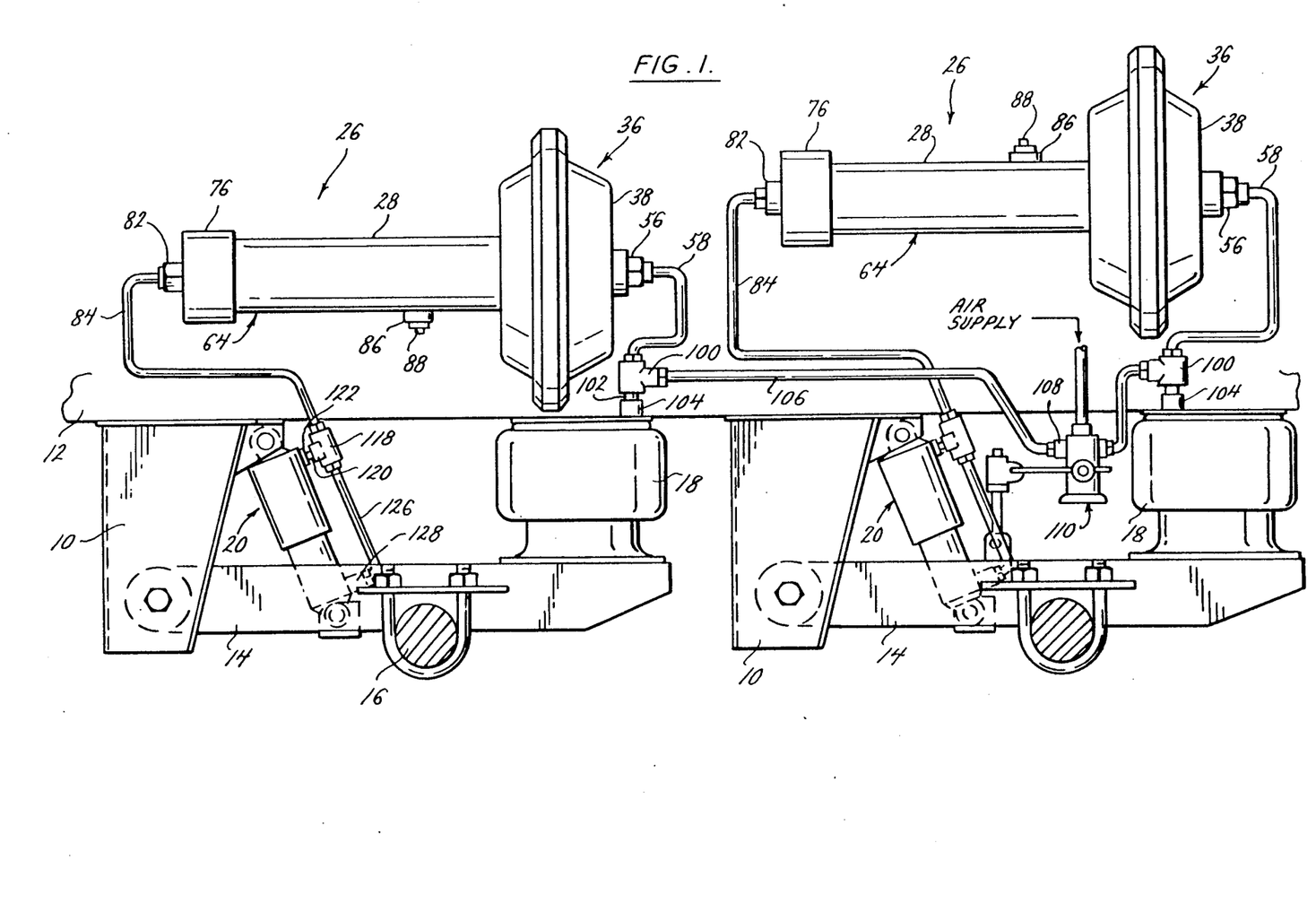
FIG. 1 is a side elevation view of the active, frequency damping suspension system of the present invention employed on a tandem axle vehicle.

FIG. 1 shows the vehicle air ride suspension system of the present invention employed on a tandem axle vehicle. As can be seen from FIG. 1, the individual suspension systems associated with each of the axles of the vehicle are identical, and therefore only one of the suspension systems shown in FIG. 1 will be described in detail. It should also be understood by those skilled in the art that the suspension system described with reference to FIG. 1 is only one half of a complete suspension system, and that a suspension system like that shown in FIG. 1 is mounted to the vehicle chassis on the opposite side of the vehicle.

The suspension system of the present invention is generally comprised of a hanger assembly 10 secured to the underside of a vehicle chassis member 12, a torque beam 14 pivotally mounted on the hanger assembly and supporting a vehicle axle 16, a pneumatic air spring 18 mounted to the torque beam and the underside of the vehicle chassis member 12, and a hydraulic shock absorber 20 pivotally mounted to the torque beam 14 and the chassis member 12.

The hanger member 10, the torque beam 14, and the vehicle axle 16 supported on the torque beam are all known structures and do not make up part of the present invention. Moreover, the semi-active, frequency damping suspension system of the present invention may be used in place of substantially any other type of suspension system employing pneumatic air springs, and it is not necessary that the system be employed with only systems comprising torque beams pivotally connected to hangers.

Figures 2, 3:
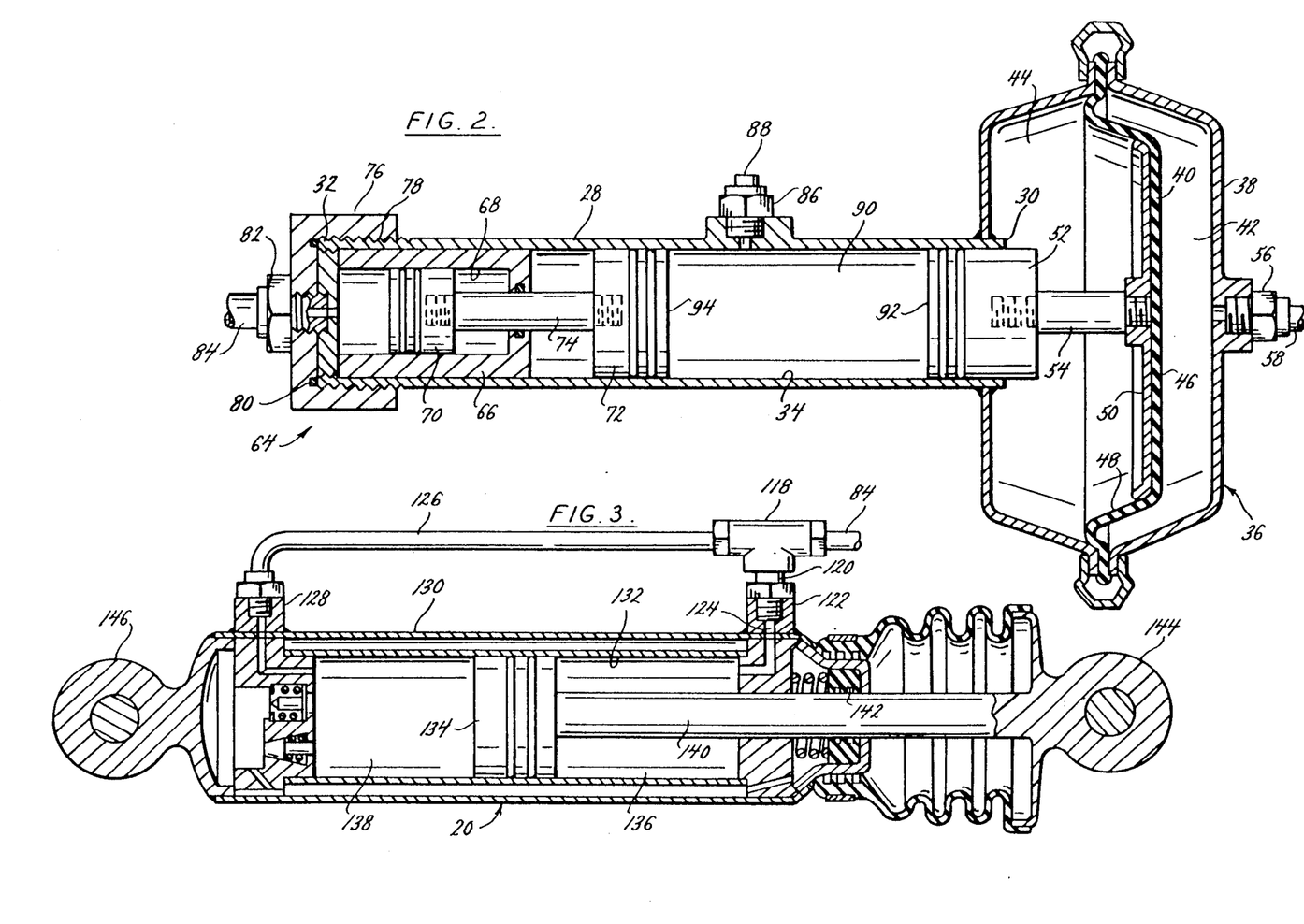
FIG. 2 is a view in section of the pressure accumulator of the suspension system of the present invention.
FIG. 3 is a view in section of the hydraulic shock absorber of the present invention and its connections with a fluid conduit circuit that communicates the shock absorber with the pressure accumulator.

The suspension system of the present invention also employs a pressure accumulator assembly 26. The pressure accumulator assembly comprises a cylindrical housing 28 with first and second ends 30, 32, and a cylindrical interior bore 34 extending through its length.

A pneumatic pressure transducer 36 is secured to the first end of the pressure accumulator housing. The pressure transducer includes a transducer housing 38 with a hermetically sealed interior. A diaphragm 40 extends across the interior of the transducer housing and divides the interior into two separate volumes 42, 44. The diaphragm 40 has a first surface 46 exposed to a first half of the interior volume 42, and a second surface 48 exposed to the second half of the interior volume 44. A connector plate 50 is secured to the second diaphragm surface 48. The connector plate 50 is mechanically connected by a piston rod 54 to a first piston 52 slidably received in the interior bore 34 of the accumulator cylindrical housing 28. A fluid pressure inlet 56 is provided on the transducer housing. The inlet 56 communicates the first interior volume 42 of the housing with a fluid pressure conduit 58.

A hydraulic pressure reducer assembly 64 is provided in the second end 32 of the pressure accumulator housing 28. The pressure reducer assembly is comprised of a cylindrical sleeve 66 inserted in the second end of the accumulator housing. The sleeve has a cylindrical interior bore 68 that is coaxial with the interior bore 34 of the accumulator housing. A pressure reducer piston 70 is slidably received in the interior bore of the pressure reducer sleeve 66. The reducer piston 70 is mechanically connected by a piston rod 74 to a second piston 72 slidably received in the interior bore 34 of the accumulator housing. The second end 32 of the accumulator housing 28 is closed and hermetically sealed by a threaded cap 76. The cap is screwed onto screw threads 78 provided over the exterior surface of the accumulator housing second end 32, and in o-ring seal 80 provides the hermetic seal at the second end of the accumulator housing. A fluid pressure inlet 82 is provided through the cap 76, and provides fluid communication between the interior bore 68 of the reducer sleeve 66 and a fluid pressure conduit 84.

An additional fluid pressure inlet 86 is provided through the cylindrical housing 28 of the pressure accumulator. This fluid pressure inlet provides fluid communication between the interior bore 34 of the accumulator housing and the exterior of the housing. The inlet 86 is sealed by a threaded plug 88 that is screwed down into the pressure inlet to hermetically seal the interior bore 34 of the accumulator housing. The interior volume 90 of the accumulator housing between the head surfaces 92, 94 of the first and second pistons 52, 72 respectively, is filled with a fluid under pressure, preferably nitrogen gas at a pressure of 50 PSI. This pressure can be varied depending on the load carried by the vehicle employing the suspension system of the invention. The nitrogen gas is supplied to the interior volume 90 through the pressure inlet 86. The gas is compressible and permits the first and second pistons 52, 72 to slide in the interior board toward each other, but always prevents the opposed head surfaces 92, 94 of the first and second pistons from contacting each other.

The fluid pressure conduit 58 in fluid communication with the first volume 42 of the transducer housing interior extends from the transducer housing 38 to a T coupling 100. A further fluid pressure conduit 102 branches off from the T coupling 100 and connects with a fluid pressure inlet 104 of the pneumatic air spring 18, thereby establishing fluid communication between the interior of the pneumatic air spring 18 and the first interior volume 42 of the pneumatic pressure transducer housing 38. A still further fluid pressure conduit 106 branches off from the T coupling 100 and connects with one of the two pneumatic pressure delivery ports 108 of a leveling valve 110, establishing fluid communication between the pneumatic pressure delivery port 18, the interior of the pneumatic air spring 18, and the first interior of the pneumatic air spring 18, and the first interior volume 42 of the pneumatic pressure transducer housing 28. The leveling valve 110 is of a type disclosed in U.S. Pat. No. 4,886,092, assigned to the assignee of the present invention and herein incorporated by reference.

The fluid pressure conduit 84 in fluid communication with the interior bore 68 of the pressure reducer assembly 64 extends to a T coupling 118. The T coupling 118 is connected by a fluid pressure conduit 120 to a first fluid pressure inlet 122 containing a flow restricting orifice or needle valve 122 containing a flow restricting orifice or needle valve 124. The inlet 122 communicates with the interior of the hydraulic shock absorber 20 at the top of the shock absorber. A still further fluid conduit 126 branches off from the T coupling 118 and connects with a fluid pressure inlet 128 communicating with the interior of the hydraulic shock absorber 20 at the bottom of the shock absorber. The fluid conduit 84, the T coupling 118, the fluid conduits 120, 126, and the fluid pressure inlets 122, 128 all establish fluid communication between the interior bore 68 of the pressure accumulator pressure reducer assembly 64 and the interior of the hydraulic shock absorber 20.

The detailed structure of the hydraulic shock absorber 20 and its fluid connections with the fluid pressure conduit 84 are shown in FIG. 3 of the drawings. The shock absorber assembly includes a cylindrical housing 130 with a cylindrical interior bore 132 extending through the housing. A piston 134 is slidably received in the interior bore 132 of the housing, and divides the interior of the shock absorber into first and second volumes 136, 138. The fluid pressure inlets 122, 128 communicate with the first and second volumes 136, 138 respectively, on the opposite sides of the piston 134. A piston rod 140 is connected to the piston 134 and extends through a hydraulic pressure seal 142 and out of the top of the shock absorber housing 130 to a pivot connection assembly 144 at its distal end. The opposite end of the shock absorber housing 130 also is provided with a pivot connection assembly 146. Pivot connection assemblies of the type employed on the shock absorber are known in the art. The pivot connection assembly 144 at the top of the shock absorber is connected to either the hanger member 10 or the vehicle chassis 12, and the pivot connection assembly 146 at the bottom of the shock absorber is connected to the torque beam 14, or to an axle seat assembly or vehicle axle if a suspension system without a torque beam is being used. The pivot connections to the opposite ends of the hydraulic shock absorber assembly may be made in any known manner.

In operation of the above described semi-active, frequency damping, suspension system, when the axle of a vehicle is moved suddenly upward toward the vehicle chassis in response to the vehicle wheels striking a large bump in the roadway, the pneumatic pressure in the air spring 18 and the hydraulic pressure in the second volume 138 of the hydraulic shock absorber 20 increase suddenly. The increasing pneumatic pressure in the pneumatic air spring assembly 18 resists and cushions the upward vertical movement of the vehicle axle toward the vehicle chassis. In conventional air ride suspension systems, when the compression of the pneumatic fluid contained in the air spring 18 had reached its limit of compression, the upward movement of the axle would be stopped suddenly and a large shock would be transmitted from the vehicle axle, through the air spring assembly, to the vehicle chassis. In the present invention, as the vehicle axle travels vertically upward toward the vehicle chassis, the leveling valve automatically responds to the axle movement to supply increased pneumatic pressure through the conduit 106, the T coupling 100, the conduit 102 and the inlet port 104, to the interior of the pneumatic air spring 18. The increased pneumatic pressure in the air spring increases the resistance of the air spring to the upward movement of the vehicle axle. In addition, the increasing pneumatic pressure in the interior of the air spring 18 is transmitted through the fluid conduit 58 to the first interior volume 42 of the pneumatic pressure transducer housing 38. This increasing pneumatic pressure acts against the first surface 46 of the diaphragm 40, causing the diaphragm 40 to move to the left as viewed in FIG. 2. The leftward movement of the diaphragm in turn pushes the connector plate 50, the piston rod 54, and the connected first piston 52 leftward, further into the interior bore 34 of the pressure accumulator cylindrical housing. The volume of pneumatic fluid 90 contained in the interior bore 34 of the pressure accumulator resists the leftward movement of the piston 52 and gradually dampens this movement. The dampening of the leftward movement of the first piston 52 also has the effect of dampening the rapidly increasing pneumatic pressure of the air spring 18 transmitted through the fluid pressure conduit circuit to the first interior volume 42 of the pneumatic pressure transducer housing 38.

Simultaneous with the rapidly increasing pneumatic pressure in the air spring 18 of the suspension system, the hydraulic fluid pressure in the second volume 138 of the hydraulic shock absorber 20 also rapidly increases due to the downward movement of the piston 134 in the shock absorber caused by the movement of the vehicle axle toward the vehicle chassis. The rapidly increasing hydraulic pressure is transmitted through the fluid inlet 128, the fluid conduit 126 to the T connection 118. At the T connection 118, a portion of the hydraulic fluid forced from the second volume 138 of the shock absorber by the movement of the piston 134, is routed back into the increasing first interior volume 136 of the shock absorber behind the shock absorber piston 134. The orifice 124 or other flow restriction provided in the fluid inlet 122 permits only a small portion of the hydraulic fluid forced from the second interior volume 138 to enter the first interior volume 136 of the shock absorber, thereby reducing to some extent the build up of hydraulic pressure in the conduits 126 and 84 due to the movement of the piston 134 in the shock absorber. The remaining increasing hydraulic pressure is transmitted through the fluid pressure conduit 84 to the fluid pressure inlet 82 at the second end of the pressure accumulator housing 28. This increasing hydraulic pressure is transmitted through the pressure inlet 82 to the interior of the pressure reducer sleeve 66 of the hydraulic pressure reducer assembly 64. The increasing hydraulic pressure acts on the face of the reducer piston 70, causing the piston to be displaced through the interior bore 68 of the reducer sleeve to the right as viewed in FIG. 2. The rightward movement of the reducer piston 70 is transmitted through the piston rod 74 to the second piston 72, causing the second piston to also move to the right through the interior bore 34 of the pressure accumulator housing.

The volume of pneumatic fluid 90 contained in the interior bore 34 of the pressure accumulator resists the rightward movement of the piston 72 and gradually dampens this movement. This also has the effect of dampening the increasing hydraulic pressure in the shock absorber. The simultaneous leftward movement of the first piston 52 and rightward movement of the second piston 72 in the pressure accumulator interior bore 34 is resisted by the increasing pressure of the pneumatic fluid 90 contained within the bore between the opposed head surfaces 92, 94 of the respective pistons. Due to the difference in surface areas between the head surface 94 of the second piston 72 and the face of the reducer piston 70, the large hydraulic pressure built up in the shock absorber second interior volume 138 and transmitted to the reducer sleeve interior bore 68 is resisted by a much smaller fluid pressure of the pneumatic fluid 90 contained in the pressure accumulator interior bore 34. In a similar manner, due to the difference in areas between the head surface 92 of the first piston 52 and the first surface 46 of the pneumatic pressure transducer diaphragm 40, the pneumatic pressure acting on the head surface 92 of the first piston is sufficient to resist and dampen the rapidly increasing pneumatic pressure in the interior of the air spring 18 and transmitted to the first interior volume 42 of the pressure transducer housing 38. In this manner, the rapidly increasing pneumatic pressure in the air spring 18 and the rapidly increasing hydraulic pressure in the shock absorber 20 are damped by the pressure accumulator 26 of the present invention, and the shock caused by the abrupt upward vertical movement of the vehicle axle relative to the chassis is substantially reduced in magnitude from the shock that would be transmitted from the vehicle axle to the vehicle chassis in conventional air ride suspension systems.

Figure 4:
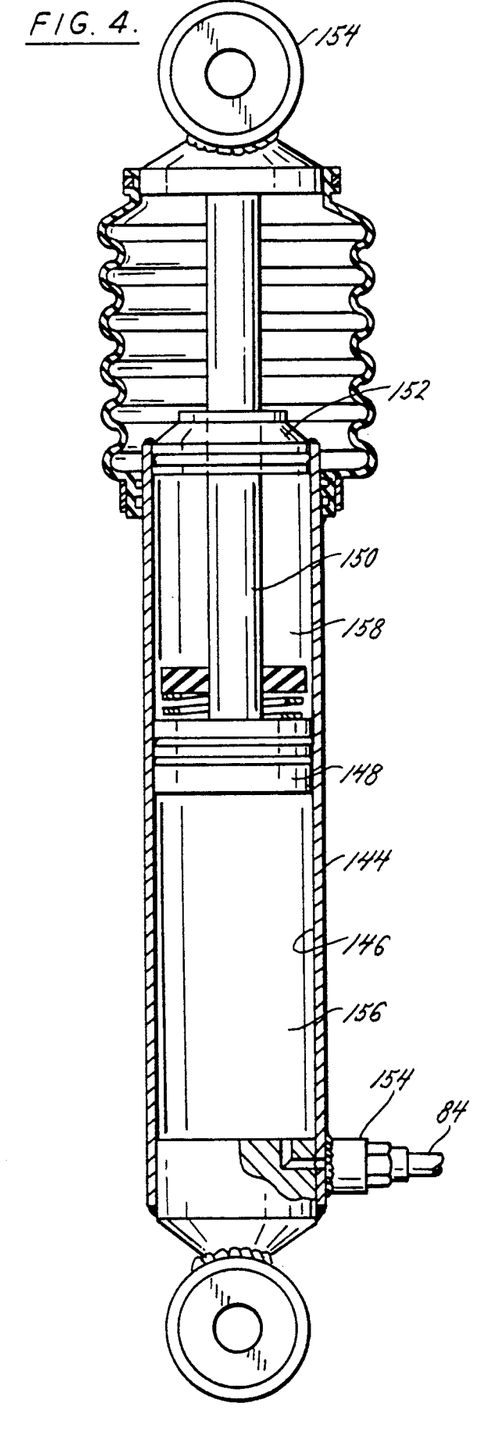
FIG. 4 is a view in section of an alternate embodiment of the hydraulic shock absorber of the suspension system of the present invention.

FIG. 4 shows an alternate embodiment of the hydraulic shock absorber assembly employed in the suspension system of the present invention. The shock absorber of FIG. 4 comprises a cylindrical housing 144 with a cylindrical interior bore 146 extending through its length. As in the first described embodiment, a piston 148 is slidably received in the interior bore of the shock absorber. The piston 148 is connected to a piston rod 150 that extends through a seal 152 at the top of the shock absorber housing. A conventional pivoting connection assembly 154 is provided at the top of the piston rod 150. In this embodiment, the peripheral surface of the piston 148 is dimensioned slightly smaller than that of the first embodiment. This permits a small amount of hydraulic fluid contained in the shock absorber housing to flow past the piston, between the piston peripheral surface and the interior bore 146 of the shock absorber as the piston is pushed through the hydraulic fluid in the shock absorber. As a result of this piston structure, a second fluid inlet connecting the hydraulic fluid pressure conduit 84 behind the shock absorber piston 148 is not needed. The fluid pressure inlet 154 provided at the bottom of the shock absorber housing 144 communicates the interior volume 156 of the shock absorber housing below the piston 148 to the fluid pressure conduit 84.

In operation, when the vehicle axle is caused to abruptly move upward toward the vehicle chassis due to the vehicle passing over a bump or falling into a hole in the roadway, the piston 148 moves rapidly downward as viewed in FIG. 4, toward the bottom of the shock absorber assembly. As the piston 148 moves downward, the hydraulic fluid contained in the interior volume 56 below the piston is rapidly compressed, and its pressure increases. As a result of the increasing pressure of the hydraulic fluid, a small portion of the fluid is pushed past the confronting peripheral surface of the piston 148 and the interior bore 146 of the shock absorber, to the increasing volume 158 of the shock absorber interior behind the piston 148. This has the effect of reducing, to a limited extent, the rapidly increasing hydraulic fluid pressure in the shock absorber volume 156 below the piston 148. The increasing pressure of the hydraulic fluid contained in the volume 156 is transmitted through the fluid pressure conduit 84 to the pressure accumulator assembly 26 in the same manner as described in the first embodiment of the invention, and the upward movement of the vehicle axle toward the vehicle chassis is damped in the same manner.

Figure 5:
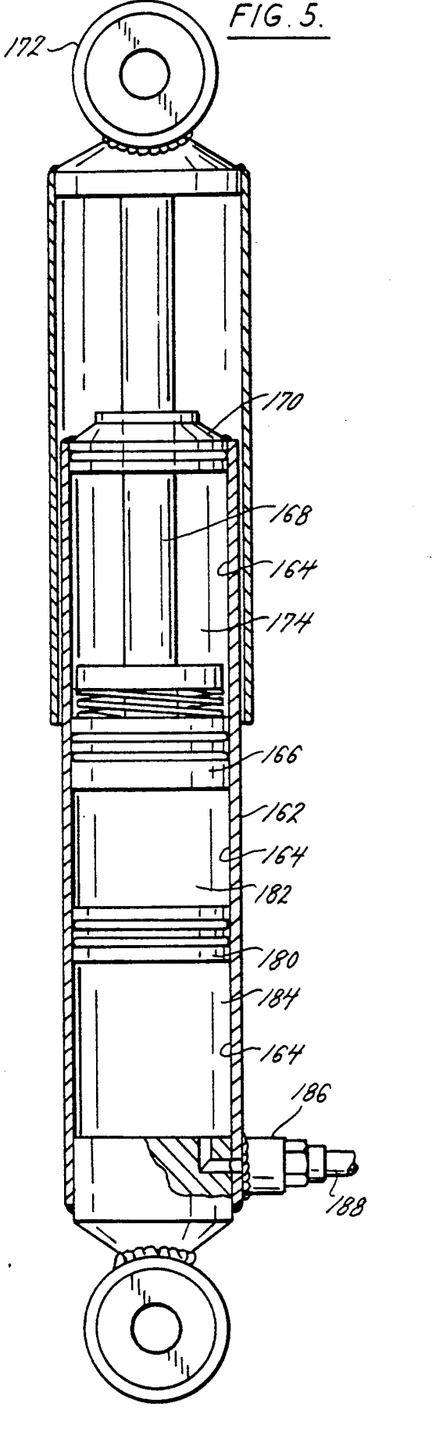
FIG. 5 is a view in section of an alternate embodiment of the shock absorber of the suspension system of the present invention.
Figure 6:
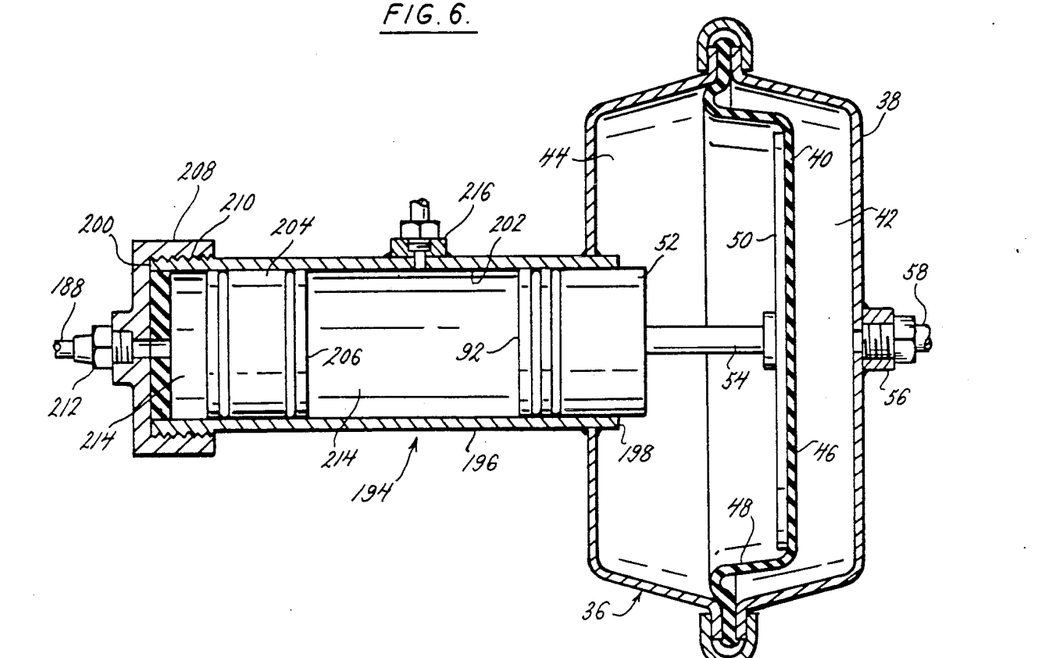
FIG. 6 is a view in section of an alternate embodiment of the pressure accumulator of the present invention.

FIGS. 5 and 6 show a still further embodiment of the present invention. The shock absorber assembly shown in FIG. 5 comprises a cylindrical shock absorber housing 162 having a cylindrical interior bore 164 extending through its length. A first piston 166 is slidably received in the interior bore of the shock absorber housing. A piston rod 168 extends from the back of the piston 166, through a sealing assembly 170 at the top of the shock absorber housing 162, to a pivot coupling assembly 172 at the top of the shock absorber assembly. The piston 166 fits inside the interior bore 164 of the shock absorber in the same manner as the piston of the previously described embodiment The piston permits a small amount of pressurized hydraulic fluid to pass between the peripheral surface of the piston and the interior bore to the interior volume 174 behind the piston as the piston is forced downward through the shock absorber interior bore. A free floating piston 180 is slidably received in the interior bore 164 of the shock absorber housing below the shock absorber piston 166 as viewed in FIG. 5. Although permitted to move axially through the interior bore of the shock absorber housing, the free floating piston 180 is fit tight into the interior bore 164 of the housing and prevents fluid communication between the two interior volumes 182, 184 that it separates in the shock absorber housing. The interior volume 182 defined by the shock absorber piston 166 and the free floating piston 180 is filled with hydraulic oil. The interior volume 184 below the free floating piston 180, as viewed in FIG. 5, is filled with a pneumatic fluid, preferably nitrogen gas. A pressure inlet port 186 is provided at the bottom of the shock absorber assembly. The pressure inlet port 186 establishes fluid communication between the shock absorber interior volume 184 containing the nitrogen gas and a fluid pressure conduit 188.

The fluid pressure accumulator assembly 194 of this embodiment of the present invention is shown in FIG. 6 of the drawings. This embodiment of the pressure accumulator also comprises a cylindrical housing 196 having first and second ends 198, 200, and a cylindrical interior bore 202 extending through the length of the housing. A pneumatic pressure transducer assembly 36 is secured to the first end 198 of the pressure accumulator housing. This pressure transducer assembly is identical to the transducer assembly described in the first embodiment of the invention, and the same reference numerals employed in describing the pressure transducer assembly of the first embodiment of the invention are used in labeling the component parts of the transducer assembly of the presently described embodiment of the invention. In a manner identical to that described in the first embodiment of the invention, the first piston 52 is mechanically connected to the diaphragm 40 of the pressure transducer assembly 36, and is slidably received in the interior bore 202 of the pressure accumulator housing 196. A second piston 204, having an end face 206 area equal to the end face 92 area of the first piston 52, is also slidably received in the interior bore 202 of the pressure accumulator housing. A threaded end cap 208 hermetically seals the second end 200 of the accumulator housing by screwing the end cap over threads 210 provided on the exterior surface of the housing. A fluid pressure inlet 212 provided in the end cap 206 establishes fluid communication between the fluid pressure conduit 188 and an interior volume 214 of the pressure accumulator housing between the end cap 208 and the second piston 204. The conduit 188 leads to the shock absorber assembly of this embodiment shown in FIG. 5. As in the first embodiment of the invention, the interior volume 214 between the opposed first and second pistons 52, 204 is filled with a pressurized pneumatic fluid through a fluid pressure inlet 216 in the housing. Preferably, the pressurized pneumatic fluid is nitrogen gas at 50 PSI.

The operation of this embodiment of the invention employing the shock absorber assembly shown in FIG. 5 and the pressure accumulator assembly shown in FIG. 6, is substantially the same as the operation of the first described embodiment of the invention. The difference in the operation of this embodiment over that of the first embodiment is that, when the vehicle passes over a bump or falls into a hole in the road, and the vehicle axle moves upward toward the vehicle chassis, the piston 166 of the shock absorber moves downward as viewed in FIG. 5. The downward movement of the piston compresses and increases the fluid pressure of the hydraulic oil contained in the volume 182 between the piston 166 and the floating piston 180. This causes the floating piston 180 to move downward and increase the pressure of the pneumatic fluid contained in the interior volume 184 of the shock absorber housing below the floating piston. Again, it is preferred that the pneumatic fluid employed be nitrogen gas. The increasing pressure of the nitrogen gas contained in the volume 184 of the shock absorber is transmitted through the fluid pressure conduit 188 to the interior volume 214 at the second end of the pressure accumulator housing. The increasing pressure of the nitrogen gas contained in the volume 212 causes the second piston 204 to slide through the interior bore 202 of the pressure accumulator housing to the right as viewed in FIG. 6. The rightward movement of the second piston 204 increases the pressure of the nitrogen gas contained within the volume 214 of the pressure accumulator housing. As in the first embodiment, the simultaneous rightward movement of the second piston 204 and the leftward movement of the first piston 52 is resisted by the increasing pneumatic pressure in the interior volume 214 of the pressure accumulator housing. Employing pneumatic fluid as the pressure transmitting medium between the shock absorber assembly and the pressure accumulator assembly as shown in FIGS. 5 and 6, and eliminating the pressure reducer assembly employed in the previous embodiments from the pressure accumulator assembly, enables the air rid suspension system of the embodiment disclosed in FIGS. 5 and 5 to operate in substantially the same manner as the first described embodiment of the invention.

Figure 7:
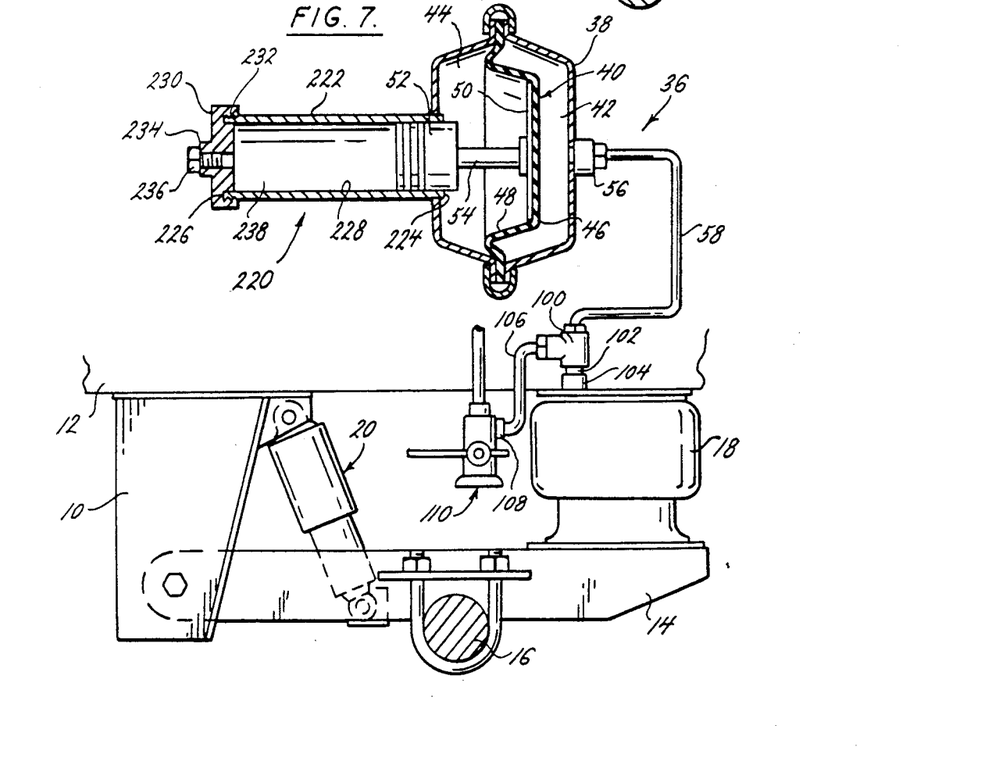
FIG. 7 is a side elevation view of an alternate embodiment of the suspension system of the present invention.

FIG. 7 shows a still further embodiment of the semiactive, frequency damping suspension system of the present invention. This embodiment of the invention is substantially identical to the previously described embodiment identical to the previously described embodiment of FIGS. 5 and 6, except that the fluid communicating connections between the pressure accumulator assembly and the shock absorber assembly have been eliminated.

The pressure accumulator assembly 220 of this embodiment also comprises a cylindrical housing 222 having first and second ends 224, 226, and a cylindrical interior bore 228 extending through the length of the housing. A pneumatic pressure transducer assembly 36, substantially identical in structure to the previously described transducer assembly of the invention, is secured to the first end 224 of the pressure accumulator housing. The same reference numerals employed in the previous description of the pressure transducer assembly 36 are used in labeling the component parts of the transducer assembly of the presently described embodiment of the invention. In a manner identical to that described in the first embodiment of the invention, the first piston 52 is mechanically connected to the diaphragm 40 of the pressure transducer assembly 36, and is slidably received in the interior bore 228 of the pressure accumulator housing 222. A threaded end cap 230 hermetically seals the second end 226 of the accumulator housing by screwing the end cap over threads 232 provided on the exterior surface of the housing. A fluid pressure inlet 234 in the end cap 206 provides access to the interior bore of the housing. The inlet is closed by a removable plug 236 threaded into the inlet. The interior volume 238 of the accumulator housing 222 between the piston 52 and the end cap 230 is filled with a pressurized pneumatic fluid through the fluid pressure inlet 234. Preferably, the pressurized pneumatic fluid is nitrogen gas.

In the same manner as that described in the first embodiment of the invention, the pneumatic pressure accumulator assembly 220 of this embodiment is connected in fluid communication with the pneumatic air spring 18 and the automatic leveling valve 110. The component parts of the fluid communication circuit are identical to those described in the embodiment of FIG. 1, and are labeled with the same reference numerals.

In operation, as the vehicle axle 16 moves upward toward the vehicle chassis 12 when passing over a bump or falling into a hole in a road, the pneumatic pressure in the air spring 18 increases rapidly. The upward movement of the axle is automatically compensated for by the leveling valve 110, by the valve supplying increased pneumatic fluid pressure through the conduit 106 to the air spring 18. The increased pneumatic pressure in the air spring 18 resists the upward movement of the axle 16 toward the vehicle chassis 12. In addition, the increasing pneumatic pressure in the interior of the air spring 18 is transmitted through the fluid conduit 58 to the first interior volume 42 of the pneumatic pressure transducer housing 38. This increasing pneumatic pressure acts against the first surface 46 of the diaphragm 40, causing the diaphragm to move to the left as viewed in FIG. 7. The leftward movement of the diaphragm pushes the connector plate 50, piston rod 54, and piston 52 leftward, pushing the piston further into the interior bore 228 of the pressure accumulator cylindrical housing. The leftward movement of the piston 52 increases the pressure of the pneumatic fluid 238 contained in the interior bore 228 of the accumulator housing. The increasing pressure of the fluid 238 resists the continued leftward movement of the piston 52, and gradually dampens this movement. The dampening of the leftward movement of the piston has the effect of dampening the rapidly increasing pneumatic pressure of the air spring 18 transmitted through the fluid pressure conduit circuit to the first interior volume 42 of the pneumatic pressure transducer housing 38. Dampening the increase in pneumatic fluid pressure in the air spring 18 in turn dampens the rate at which the upward movement of the vehicle axle 16 toward the chassis 12 is stopped and reversed. In this manner, a large shock transmitted to the vehicle chassis 12 from the vehicle passing over a large bump or through a large hole in the roadway is avoided While the present invention has been described by reference to specific embodiments, it should be understood that modifications and variations of the invention may be constructed without departing from the scope of the invention defined in the following claims.

What is claimed is:

1. A frequency damping suspension system for a vehicle having a chassis and at least one axle, the system comprising:

a pneumatic spring means having a first end adapted to be mechanically connected to the vehicle axle, and a second end adapted to be mechanically connected to the vehicle chassis;

a hydraulic shock absorbing means having a first end adapted to be mechanically connected to the vehicle axle, and a second end adapted to be mechanically connected to the vehicle chassis; and, a fluid pressure accumulator means connected in fluid communication with both the pneumatic spring means and the hydraulic shock absorbing means.

2. The suspension system of claim 1 comprising:

a pneumatic fluid pressure conducting means connecting the pressure accumulator means in fluid communication with the pneumatic spring means, and a hydraulic fluid pressure conducting means connecting the pressure accumulator means in fluid communication with the hydraulic shock absorbing means.

3. The suspension system of claim 1 comprising:

the pneumatic spring means being an air spring;

the hydraulic shock absorbing means being a hydraulic shock absorber;

the pressure accumulator means having first and second ends;

the pneumatic fluid pressure conducting means including a first fluid conducting conduit connected between the first end of the accumulator means and the air spring, the first conduit conducting pneumatic fluid pressure between the accumulator means and the air spring; and the hydraulic fluid pressure conducting means including a second fluid conducting conduit connected between the second end of the accumulator means and the shock absorber, the second conduit conducting hydraulic fluid pressure between the accumulator means and the shock absorber.

4. The suspension system of claim 3 comprising:

the pressure accumulator means having a cylinder housing with first and second pistons slidably received within the cylinder housing, the first and second pistons having head surfaces that are separated from each other by a damping fluid contained within the housing between the pistons, the first piston being adapted to slide within the housing in response to fluctuations in the pneumatic fluid pressure conducted between the accumulator means and the air spring by the first conduit, and the second piston being adapted to slide within the housing in response to fluctuations in the hydraulic fluid pressure conducted between the accumulator means and the shock absorber by the second conduit.

5. The suspension system of claim 4 comprising:

the accumulator means including a transducer housing at its first end connected to the cylinder housing, the transducer housing containing a diaphragm having first and second surfaces, the first diaphragm surface being exposed to the pneumatic fluid pressure conducted between the accumulator means and the air spring causing the diaphragm to move within the transducer housing in response to fluctuations in the pneumatic fluid pressure, and the second diaphragm surface interacting with the first piston causing the first piston to reciprocate in the cylinder housing in response to movement of the diaphragm.

6. The suspension system of claim 4 comprising:

the accumulator means including a pressure reducer at its second end connected to the cylinder housing, the pressure reducer containing a reducer piston having first and second surfaces, the second reducer piston surface being exposed to the hydraulic fluid pressure conducted between the accumulator means and the shock absorber causing the reducer piston to move within the pressure reducer in response to fluctuations in the hydraulic fluid pressure, and the first reducer piston surface interacting with the second piston causing the second piston to reciprocate in the cylinder housing in response to movement of the reducer piston.

7. The suspension system of claim 5 comprising:
the diaphragm second surface being mechanically connected to the first piston.

8. The suspension system of claim 6 comprising:
the reducer piston first surface being mechanically connected to the second piston.

9. The suspension system of claim 6 comprising:
the pressure reducer being a cylindrical sleeve inserted into the second end of the accumulator means cylinder housing, the reducer piston being slidably received within the cylindrical sleeve.

10. The suspension system of claim 4 comprising:
the head surfaces of the first and second pistons having the same area.

11. The suspension system of claim 6 comprising:
the first surface of the reducer piston having an area that is less than the area of the head surface of the second piston.

12. The suspension system of claim 3 comprising:
the hydraulic shock absorber including a cylinder housing with an interior bore and a piston slidably received in the interior bore, and first and second inlet ports in the shock absorber housing adjacent the first and second ends of the shock absorber respectively, the first and second ports fluidly communicating the second fluid conducting conduit with the interior bore of the shock absorber housing on opposite sides of the piston contained in the housing.

13. The suspension system of claim 12 comprising:
the first and second inlet ports each providing a fluid channel communicating hydraulic fluid in the second conduit with the interior bore of the shock absorber housing, the channel of the first inlet port having an effective cross-sectional area that is less than an effective cross-sectional area of the channel of the second fluid port.

14. A frequency damping suspension system for a vehicle having a chassis and an axle, the system comprising:
a hanger means adapted to be connected to a vehicle chassis;
an axle seat means adapted to support a vehicle axle;
a torque beam means having a first end connected to the hanger means and a second end connected to the axle seat means;
a pneumatic spring means having a first end connected to the torque beam means and a second end connected to the vehicle chassis;
a hydraulic shock absorbing means having a first end connected to the torque beam means and a second end connected to the vehicle chassis; and
a fluid pressure accumulator means connected in fluid communication with both the pneumatic spring means and the hydraulic shock absorbing means.

15. The suspension system of claim 14 comprising:
a first fluid pressure conducting means connected between the pressure accumulator means and the pneumatic spring means, and a second fluid pressure conducting means connected between the pressure accumulator means and the hydraulic shock absorbing means.

16. The suspension system of claim 15 comprising:
the accumulator means having a housing with a cylindrical interior bore, and first and second pistons slidably received in the interior bore, the first and second pistons being separated by a damping fluid contained within the interior bore between the pistons.

17. The suspension system of claim 16 comprising:
the first piston of the accumulator means being adapted to interact with pneumatic pressure of the spring means conducted to the accumulator means by the first fluid pressure conducting means to cause the first piston to move in the interior bore in response to fluctuations in the pneumatic pressure of the spring means, movement of the first piston being resisted by the second piston and the damping fluid, thereby damping fluctuations in the pneumatic pressure of the spring means.

18. The suspension system of claim 16 comprising:
the second piston of the accumulator means being adapted to interact with hydraulic pressure of the shock absorbing means conducted to the accumulator means by the second fluid pressure conducting means to cause the second piston to move in the interior bore in response to fluctuations in the hydraulic pressure of the shock absorbing means, movement of the second piston being resisted by the first piston and the damping fluid, thereby damping fluctuations in the hydraulic pressure of the shock absorbing means.

19. A frequency damping suspension system for a vehicle having a chassis and at least one axle, the system comprising:
a pneumatic spring means containing pneumatic fluid under pressure and having a first end adapted to be mechanically connected to a vehicle axle, and a second end adapted to be mechanically connected to a vehicle chassis,
a leveling valve in fluid communication with the pneumatic spring means and adapted to respond to changes in a vertical distance between the vehicle chassis and the vehicle axle to adjust the pneumatic pressure of the pneumatic spring means; and
a pneumatic pressure accumulator means in fluid communication with the pneumatic spring means and the leveling valve and adapted to dampen fluctuations in the pneumatic fluid pressure caused by changes in the vertical distance between the vehicle chassis and the vehicle axle, the pneumatic pressure accumulator means including a housing containing a diaphragm, the diaphragm being in direct fluid communication with the leveling valve and the pneumatic spring means.

* * * * *

UNITED STATES PATENT AND TRADEMARK OFFICE
CERTIFICATE OF CORRECTION

PATENT NO. : 5,052,712
DATED : October 1, 1991
INVENTOR(S) : Raidel

It is certified that error appears in the above-indentified patent and that said Letters Patent is hereby corrected as shown below:

On the title page: and Column 1, lines 2-3,

Amend the title to read:
ACTIVE SUSPENSION RIDE CONTROL HAVING AIR RIDE FREQUENCY REGULATOR AND EQUALIZER Signed and Sealed this First Day of March, 1994

Attest:

BRUCE LEHMAN

Attesting Officer

Commissioner of Patents and Trademarks